United States Patent [19]
Choquette

[11] Patent Number: 6,088,784
[45] Date of Patent: Jul. 11, 2000

[54] PROCESSOR WITH MULTIPLE EXECUTION UNITS AND LOCAL AND GLOBAL REGISTER BYPASSES

[75] Inventor: Jack H. Choquette, Los Altos, Calif.

[73] Assignee: SandCraft, Inc., Santa Clara, Calif.

[21] Appl. No.: 09/281,620

[22] Filed: Mar. 30, 1999

[51] Int. Cl.[7] .................................................. G06F 15/16
[52] U.S. Cl. .................................................................. 712/32
[58] Field of Search ............................... 712/23, 32, 41, 712/201, 208

[56] References Cited

U.S. PATENT DOCUMENTS

| | | | |
|---|---|---|---|
| 4,003,028 | 1/1977 | Bernette et al. | 340/172.5 |
| 4,120,638 | 10/1978 | Christian et al. | 425/135 |
| 4,354,228 | 10/1982 | Moore et al. | 364/200 |
| 4,382,279 | 5/1983 | Ugon | 364/200 |
| 4,413,317 | 11/1983 | Swenson | 364/200 |
| 4,422,741 | 12/1983 | Masunaga et al. | 354/403 |
| 4,434,132 | 2/1984 | Cook | 376/259 |
| 4,445,177 | 4/1984 | Bratt et al. | 364/200 |
| 4,455,602 | 6/1984 | Baxter, III et al. | 364/200 |
| 4,493,027 | 1/1985 | Katz et al. | 364/200 |
| 4,525,780 | 6/1985 | Bratt et al. | 364/200 |
| 4,661,310 | 4/1987 | Cook et al. | 376/259 |
| 4,750,112 | 6/1988 | Jones et al. | 364/200 |
| 4,760,519 | 7/1988 | Papworth et al. | 364/200 |
| 4,777,594 | 10/1988 | Jones et al. | 364/200 |
| 4,873,630 | 10/1989 | Rusterholz et al. | 364/200 |
| 4,888,679 | 12/1989 | Fossum et al. | 364/200 |
| 4,942,525 | 7/1990 | Shintani et al. | 364/200 |
| 4,955,024 | 9/1990 | Pfeiffer et al. | 371/40.1 |
| 4,985,848 | 1/1991 | Pfeiffer et al. | 364/518 |
| 5,049,871 | 9/1991 | Sturgis et al. | 340/825.05 |
| 5,109,348 | 4/1992 | Pfeiffer et al. | 395/164 |
| 5,123,108 | 6/1992 | Olson et al. | 395/800 |
| 5,129,060 | 7/1992 | Pfeiffer et al. | 395/166 |
| 5,146,592 | 9/1992 | Pfeiffer et al. | 395/157 |
| 5,204,829 | 4/1993 | Lyu et al. | 364/748 |
| 5,295,258 | 3/1994 | Jewett et al. | 395/575 |
| 5,351,146 | 9/1994 | Chan et al. | 359/118 |
| 5,420,997 | 5/1995 | Browning et al. | 395/425 |
| 5,454,089 | 9/1995 | Nguyen et al. | 395/375 |
| 5,477,858 | 12/1995 | Norris et al. | 128/660.05 |
| 5,487,181 | 1/1996 | Dailey et al. | 455/38.3 |
| 5,488,709 | 1/1996 | Chan | 395/445 |
| 5,517,626 | 5/1996 | Archer et al. | 395/290 |
| 5,570,375 | 10/1996 | Tsai et al. | 371/22.3 |
| 5,574,939 | 11/1996 | Keckler et al. | 395/800 |
| 5,583,450 | 12/1996 | Trimberger et al. | 326/41 |
| 5,600,263 | 2/1997 | Trimberger et al. | 326/39 |
| 5,603,047 | 2/1997 | Caulk, Jr. | 395/800 |
| 5,629,637 | 5/1997 | Trimberger et al. | 326/93 |
| 5,644,580 | 7/1997 | Champlin | 371/22.5 |
| 5,646,545 | 7/1997 | Trimberger et al. | 326/38 |
| 5,666,514 | 9/1997 | Cheriton | 711/144 |
| 5,699,537 | 12/1997 | Sharangpani et al. | 395/393 |
| 5,701,441 | 12/1997 | Trimberger | 395/500 |
| 5,724,537 | 3/1998 | Jones | 395/401 |
| 5,737,562 | 4/1998 | Caulk, Jr. | 395/394 |
| 5,742,780 | 4/1998 | Caulk, Jr. | 395/382 |

*Primary Examiner*—David Y. Eng
*Attorney, Agent, or Firm*—Blakely, Sokoloff, Taylor & Zafman

[57] ABSTRACT

A method and an apparatus for data processing between multiple execution units using local and global register bypasses is disclosed. In one embodiment, the device contains a register file, at least two bypass circuits, a plurality of execution units, and a control circuit. Each bypass circuit connects to at least one execution unit. The control circuit, which is coupled to the execution units, limits no more than one clock delay per each execution clock cycle. The control circuit further designates delay clock cycles for handling delays.

29 Claims, 7 Drawing Sheets

PROCESSOR WITH MULTIPLE EXECUTION UNITS AND LOCAL AND GLOBAL REGISTER BYPASSES

BACKGROUND OF THE INVENTION

Field of the Invention

The present invention relates to the field of computer system, and more specifically, the present invention relates to register data processing.

Description of the Related Art

A modern computer system typically contains a plurality of execution units and a register file where the register file is generally an integral part of processing unit. The register file is normally a set of general purpose registers where each register may either be 16, 32, or 64 bits wide. One function of the register file or general purpose registers is to provide a temporary storage location during data processing. For example, an instruction unit may use general purpose registers to store addresses and data during an instruction fetch operation. It should be noted that the general purpose registers are frequently accessed during executions and, consequently, the rate of access to the register file is typically high.

One conventional approach to reduce the access rate to the register file is to employ a bypass circuit. A typical bypass circuit allows data to be distributed to various execution units before the data is stored in the register file.

FIG. 1 illustrates a conventional layout of a register file system 100. The register file system 100 includes a register file 102, a bypass circuit 104, and execution units 1, 2, 3. The register file 102 typically contains 16, 32, or 64 general purpose registers where each general purpose register could be 8, 16, 32 or 64 bits wide.

A bypass circuit 104 allows data to bypass the register file 102 so that the data can be used by an execution unit at the next clock cycle. For example, an output data from execution unit 1 can be bypassed back to execution unit 1 through the bypass circuit 104. In other words, an output data of an execution unit can become an input data to an execution unit at the next clock cycle.

A problem with the conventional approach is time delay that occurs during bypasses. Time delay generally includes bypass circuit delay and wire (or bus) delay where the bypass circuit delay is typically similar to gate delay. A gate delay traditionally takes a small portion of a clock cycle. The wire delay includes long wire delay and short wire delay where short wire delay normally takes a small portion of a clock to perform. However, the long wire delay traditionally takes a large portion of a clock to perform. Thus, long wire delay reduces the overall system performance.

Referring back to FIG. 1, short wire 116 and 122 typically cause short wire delays because the bypass circuit 104 and execution unit 1 are physically located close to each. On the other hand, long wire 112, 114, 120, and 122 may render long wire delays because the distances between the bypass circuit 104 and execution unit 2 and 3 are long. Long wire 112 may contain a plurality of transmission wires to transfer data from the bypass circuit 104 to execution unit 3 while long wire 114 may also contain a plurality of transmission wires to transfer data from the bypass circuit 104 to execution unit 2. Both long wire 114 and 112 may cause long wire delays as indicated by alpha α during data transactions. Likewise, long wire 120 may also contain a plurality of transmission wires for transferring data from execution unit 2 to the bypass circuit 104. Similarly, long wire 122 transfers data from execution unit 3 to the bypass circuit.

Both long wire 120 and 122 typically cause long wire delays, as indicated by beta "B" in FIG. 1, during data transactions. Each long wire delay typically allocates a large portion of a clock cycle for delay and consequently, long wire delays (or alpha and beta delays) are not desirable because such delays decrease overall system performance.

Another problem with the conventional approach is poor work load distribution between clock cycles. Work load typically refers to all work to be accomplished within a clock cycle. For example, a work load includes handling delays as well as functional executions. Poor work load distribution generally renders lower system performance.

Therefore, it is desirable to have a scheme of improved work load distribution and reducing long wire delay to enhance system performance. As can been seen, an embodiment of a register file system having at least one local bypass circuit provides an improved work load distribution and at the same time, reduces long wire delays.

SUMMARY OF THE INVENTION

A method and an apparatus for data processing between multiple execution units using local and global register bypasses is disclosed. In one embodiment, the apparatus contains a register file, at least two bypass circuits, a plurality of execution units, and a control circuit. Each bypass circuit is connected to at least one execution unit. The control circuit, which is coupled to the execution units, limits the number of delays that each execution cycle can have. Furthermore, the control circuit also designates delay clock cycles to handle long wire delays.

In another embodiment, the apparatus includes a pre-execution circuit, which is coupled to execution units. The pre-execution circuit performs pre-execution functions between the end of the current execution cycle and the beginning of the next execution cycle.

BRIEF DESCRIPTION OF THE DRAWINGS

The present invention is illustrated by way of example and not by limitation in the accompanying figures.

DETAILED DESCRIPTION

A method and an apparatus for data processing between multiple execution units using local and global data bypasses is disclosed. In the following description numerous specific details are set forth in order to provide a thorough understanding of the present invention. It will be apparent, however, to one having ordinary skill in the art that the specific detail need not be employed to practice the present invention. In other instances, well known materials or methods have not been described in detail in order to avoid obscuring the present invention.

In one embodiment, a register file system includes a global and a plurality of local bypass circuits. Each bypass circuit is coupled to at least one execution unit. The global bypass circuit may be connected to both execution units and local bypass circuits.

The global bypass circuit provides an alternative method to distribute data where the data may take a short-cut through a bypass circuit to reach the destination(s). In the embodiment, the bypasses are also available between the global bypass circuit to a local bypass circuit. It should be noted that the global bypass circuit and the local bypass circuit are normally located far apart.

In another embodiment, a local bypass circuit is used to reduce the occurrence of long wire delays. A local bypass circuit is connected to at least one execution unit where the execution unit(s) is generally located far from the global bypass circuit. The local bypass circuit facilities data bypasses between the execution units.

The register file system also contains a control circuit where the control circuit designates delay cycles and execution cycles. A delay cycle is a clock cycle that is dedicated to handling various delays during the execution. Likewise, an execution cycle is a clock cycle that is dedicated to executing functions. A half delay cycle may be used to handle a long wire delay while a full delay cycle may be used to handle more than one long wire delays.

In another embodiment, the register file system contains a pre-execution circuit, which performs pre-execution functions during delay cycles. The pre-execution functions are typically simple functions, such as forcing a constant, data format conversion, operand alignment, et cetera. It should be noted that delays typically do not occupy the entire delay cycles. Thus, the extra time left after handling the delays can be used to perform the pre-execution functions.

In yet another embodiment, the register file system uses a plurality of local bypass circuits to modulate an improved work load distribution per each clock cycle. An enhanced work load distribution normally refers to a substantially equal distribution of work load per each clock cycle. Accordingly, this embodiment of register file system can handle a faster clock, which may improve overall system performance.

Figure 2:
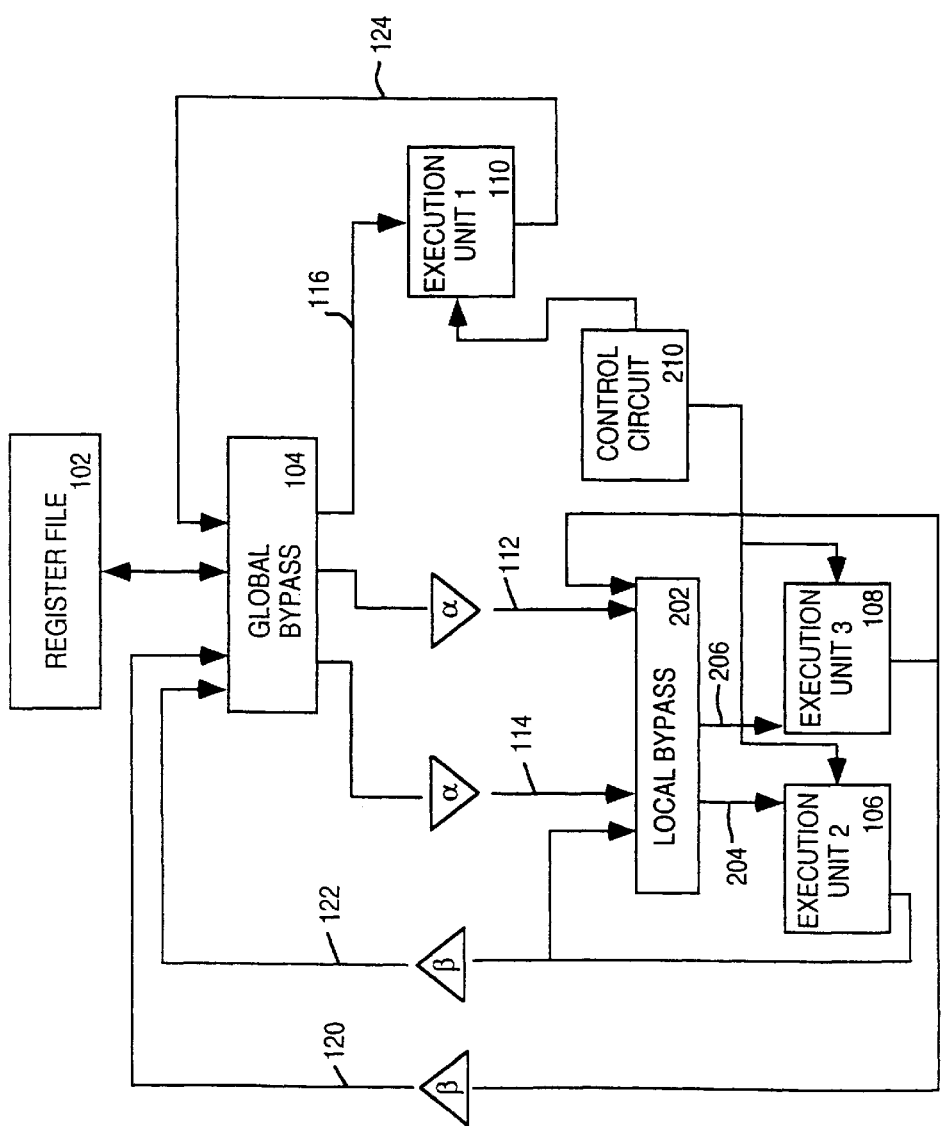
FIG. 2 illustrates an embodiment of a register file system having local and global bypass circuits in accordance with the present invention.

FIG. 2 illustrates a register file system 200, which includes a register file 102, a global bypass circuit 104, a local bypass circuit 202, a control circuit 210, and execution units 106,108 and 110. The register file 102 is typically a set of general purpose registers where each register may be 16, 32, 64, or 128 bits wide. The registers are normally used for holding data during the execution.

The global bypass circuit 104 provides a bypass function, which allows data to be distributed to execution units before the data is stored in the register file. The global bypass circuit 104 further controls the access of the register file 102. Upon receipt of data, the global bypass circuit 104 identifies whether the data should be stored in the register file 102 or taken a bypass. Moreover, the global bypass circuit 104 searches and fetches data from the register file 102 upon requests from execution units.

In one embodiment, the local bypass circuit 202, like the global bypass circuit 104, also provides a local bypass function, which allows data to be bypassed within execution units that are connected to the local bypass circuit 202. In another embodiment, the local bypass circuit 202 improves work load distribution per each clock cycle. It should be noted that the register file system 102 may contain more than one global and local bypass circuit where each bypass circuit could be coupled to a plurality of execution units.

The execution units may be fixed-point arithmetic units, floating-point arithmetic units, instruction units, et cetera. In one embodiment, the execution units may also be multipliers, cache memories, memory control circuits, alignment circuits, normalization circuits, et cetera.

In another embodiment, each execution unit is coupled to the control circuit 210, which controls timing during the execution. The control circuit 210 designates execution cycles and delay cycles where a delay cycle is a clock cycle that is dedicated to handling various delays during the execution. Likewise, an execution cycle is a clock cycle that is dedicated to executing functions. In yet another embodiment, the control circuit 210 controls pre-execution functions during delay cycles. It should be noted that the execution unit 110 is situated relative closer to the global bypass circuit 104, whereas the local bypass circuit 202, execution unit 106, and 108 are situated relative far from the global bypass circuit 104.

In operation, if the data requested by execution unit 110 is located in the register file 102, the global bypass circuit 104 fetches the data from the register file 102 and passes the data to execution unit 110. On the other hand, if the data requested by execution unit 110 is the output of execution unit 106, the global bypass circuit 104 could directly bypass the output from execution unit 106 to execution unit 110.

Likewise, if the data requested by execution unit 108 is the output of the execution unit 106, the local bypass circuit 202 can bypass the output from execution unit 106 to execution unit 108. Alternatively, the output of execution unit 106 can also be passed through the global bypass circuit 104. However, it should be noted that using the global bypass as the described above can take substantially longer time to distribute the output data than using the local bypass circuit 202. As can be seen, local bypass circuits can improve system performance and, reduces delays.

Referring to FIG. 2, the register file system 200 further shows alpha delays on wires or buses 112 and 114, and beta delays on wires or buses 120 and 122. Bus and wires are synonymous. As described previously, both alpha and beta delays are long wire delays. Alpha delays are situated between the global bypass circuit 104 to the local bypass circuit 202. Similarly, beta delays are long wire delays between the execution unit 106 or 108 to the global bypass circuit 104. It should be noted that the alpha delays on wire 112 and wire 114 do not need to be same. Likewise, the beta delays on wire 120 and 122 do not need to be same.

During the execution, the control circuit 210 designates delay cycles to handle long wire delays. Also, an execution cycle is designated for executing functions. In addition, pre-execution functions may be performed during delay cycles.

Figure 1:
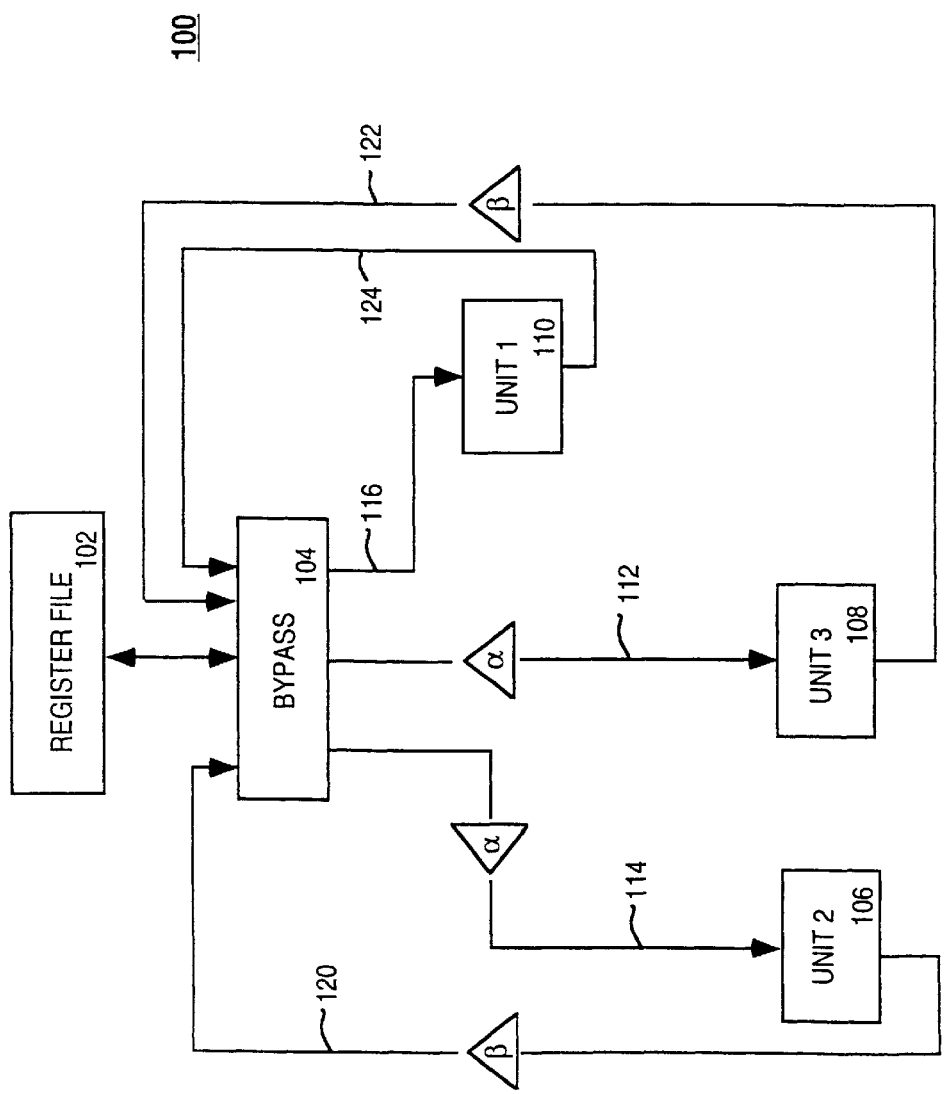
FIG. 1 is a conventional layout of a register file system including a bypass circuit.
Figure 3:
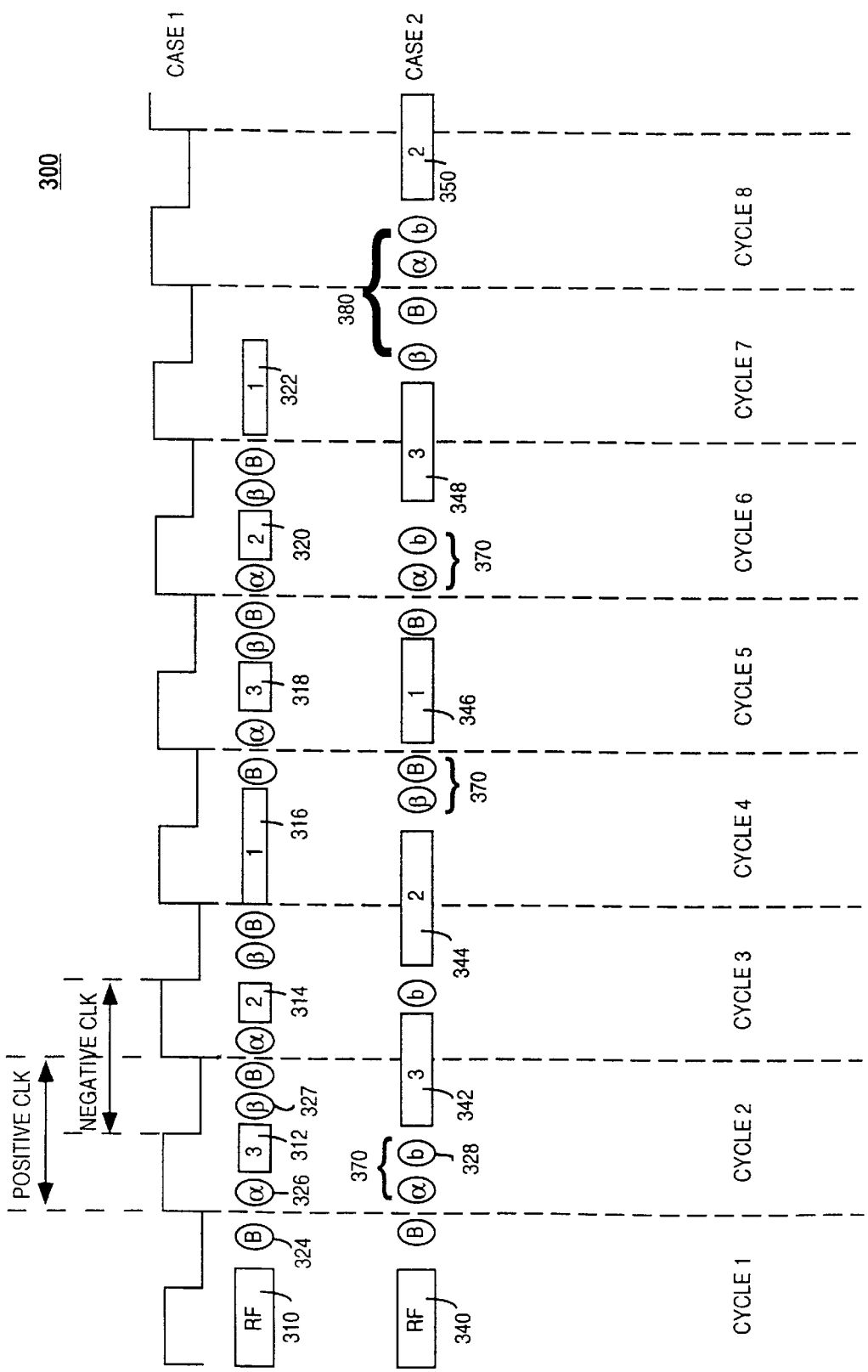
FIG. 3 is a timing diagram illustrating a comparison of timing charts between a conventional register file system and an embodiment of register file system.

FIG. 3 is a timing diagram 300 illustrating timing charts for both conventional register file system and an embodiment of register file system with global and local bypass circuits. The timing diagram 300 includes two cases where case 1 shows a timing chart of a conventional register file system, which is also illustrated in FIG. 1. Case 2 demonstrates a timing chart of an embodiment of the register file system 200 illustrated in FIG. 2.

The timing diagram 300 includes eight positive and negative clock cycles where each positive clock cycle starts at the rising edge of a clock cycle. Conversely, the negative clock cycle begins at the falling edge of a clock cycle. Some execution units take positive clock cycles as execution cycles while other execution units take negative clock cycle as execution cycles. In one embodiment, execution cycles for execution unit 106 and 108 are negative clock cycles while execution cycles for execution unit 110 are positive clock cycles. It should be noted that functions are executed during execution cycles and delays are handled during delay cycles Case 1 illustrated in FIG. 3 is a timing chart for a data flow where the data flows from the register file ("RF") 102 to execution unit 3, 2, 1, 3, 2, and 1. At cycle 1, accessing RF 310 and a global bypass circuit delay 324, which is also indicated by B, are performed. At cycle 2, alpha delay 326, executing the functions of the execution unit 312, beta delay 327, and the global bypass circuit delay indicated by B are performed. At cycle 3, an alpha delay, functions of the execution unit 314, a beta delay, and the global bypass circuit delay are performed. At cycle 4, executing the functions of the execution unit 316 and the global bypass circuit delay are performed. It should be noted that for case 1, the work load distribution between cycle 3 and cycle 4 is poorly distributed because there is more work load allocated at cycle 3 than at cycle 4. It should be further noted that if a faster clock is deployed, which will render more clock cycles with shorter duration, the work load at cycle 4 may be able to complete within a faster clock cycle whereas the work load at cycle 2 or 3 may not be able to complete within a faster clock cycle. Thus, the register file system represented in case 1 is not likely to be able to handle a faster clock.

Case 2 illustrated in FIG. 3 is a timing chart of an embodiment for a data flow where the data flows from the RF to execution unit 3, 2, 1, 3, and 2. At cycle 1, accessing RF 340 and a global bypass circuit delay indicated by B are performed. At the first half of cycle 2, a delay cycle 370 is introduced to handle an alpha delay and a local bypass circuit delay 328. From the second half of cycle 2, a negative clock cycle for an execution cycle begins where the function of execution unit 3 and a local bypass circuit delay are performed. At the second half of cycle 3 to the first half of cycle 4, the function of execution unit 2 is performed. At the second half of cycle 4, another delay cycle is issued to handle a beta delay and a global bypass circuit delay. At cycle 5, the function of execution unit 1 and a global bypass circuit delay are performed. It should be noted that the execution cycle at cycle 5 is a positive clock cycle. Also, a full delay cycle 380 is used to handle multiple delays.

Using mixed positive and negative clock cycles gives an improved work load distribution per clock cycle. Comparing case 1 and 2, it should be noted that case 2 demonstrates an improved work load distribution over case 1 because each execution cycle in case 2 handles no more than one delay. In other words, most of the clock cycle duration in case 2 can be dedicated to executing functions. Accordingly, a faster clock can be used in the register file system 200 where a local bypass circuit is used. It should be noted that the register file system 200 could have more than one local and global bypass circuits.

In another embodiment, pre-executions may be performed during the delay cycle 370. Delay cycles are designated for delays, such as RC delays, wire delays, processing delays, et cetera. However, a long wire 112 of FIG. 2 can typically propagate data well before the end of delay cycle. Consequently, pre-execution during delay cycles can be performed to enhance the system performance.

Figure 4:
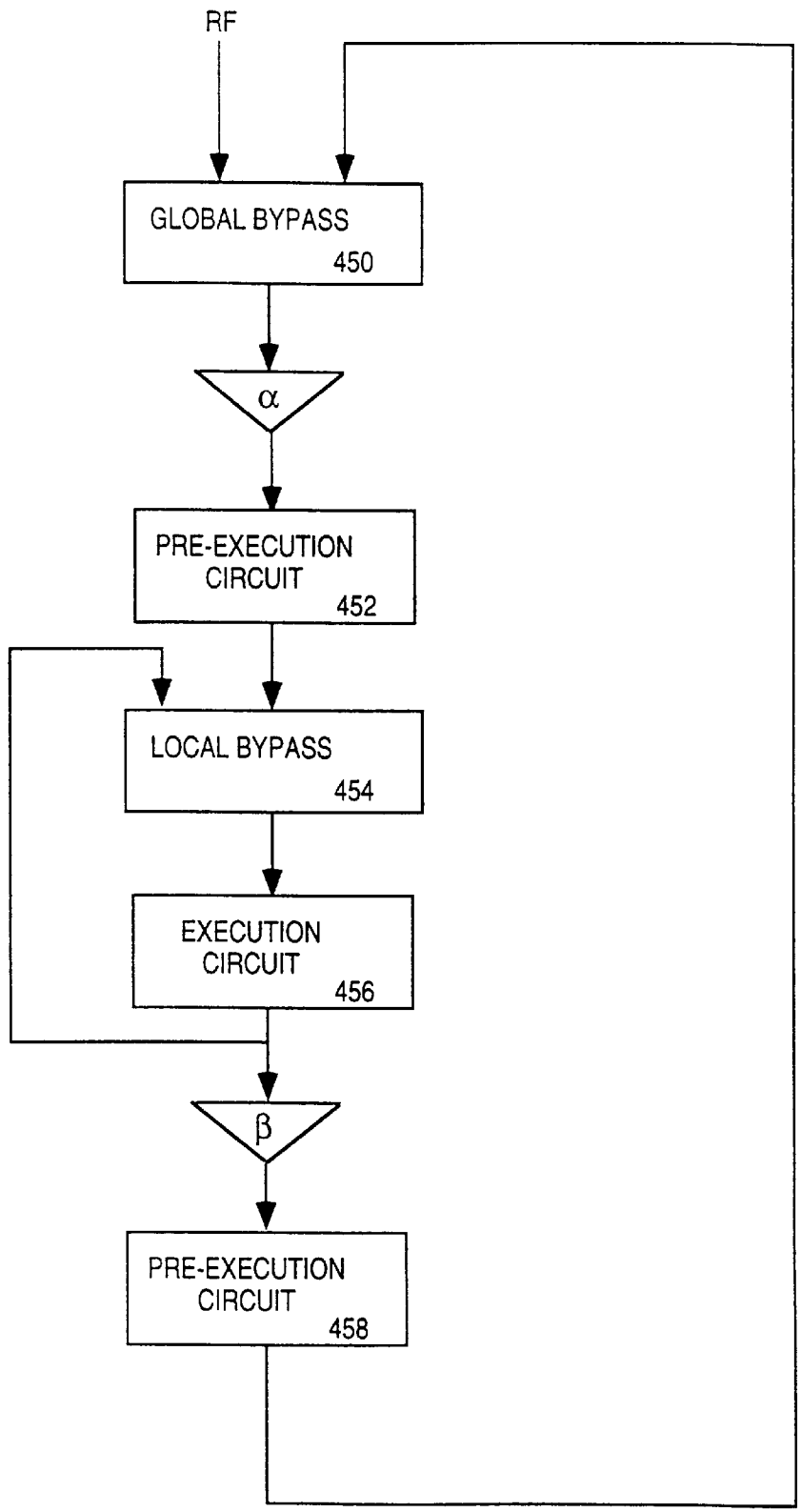
FIG. 4 illustrates a layout of register file system having local bypass circuits in accordance with the present invention.

FIG. 4 illustrates a layout of a register file system 400 having pre-execution circuits. The layout 400 includes a global bypass circuit 450, a local bypass circuit 454, two pre-execution circuits 452 and 458 and an execution unit 456. In one embodiment, pre-execution circuits perform pre-execution functions during delay cycles. In other words, pre-execution functions may be performed when alpha or beta delay has occurred.

The pre-execution circuit 452 is commonly situated between the global bypass circuit 450 and the local bypass circuit 454 where the pre-execution circuit 452 performs pre-execution functions when an alpha delay occurs. The pre-execution circuit 452 is also called alpha pre-execution circuit. Similarly, another pre-execution circuit 458 may be used between the execution unit 456 and the global bypass circuit 450 where the pre-execution circuit 458 performs pre-execution functions when a beta delay occurs. Thus, the pre-execution circuit 458 is also called beta pre-execution circuit. It should be noted that the alpha pre-execution circuit and the beta pre-execution circuit do not need to be able to perform same or similar functions. In another embodiment, pre-execution is not performed when a bypass is taken from the execution unit 456 to the local bypass circuit 454.

Figure 5:
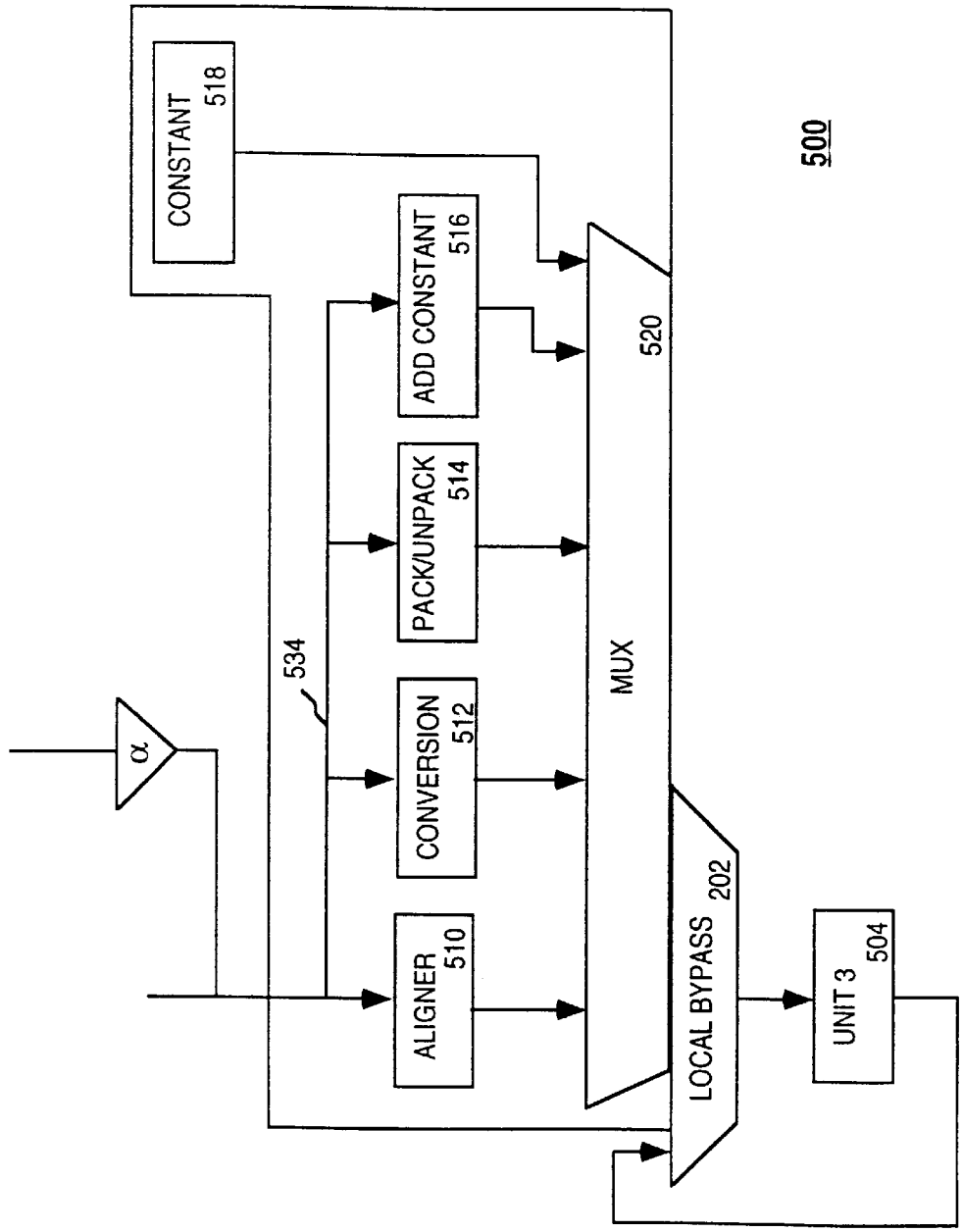
FIG. 5 illustrates an embodiment of pre-execution circuit in accordance with the teachings of the present invention.

FIG. 5 illustrates an embodiment of pre-execution circuit 500 where it contains an aligner 510, a conversion circuit 512, a pack and unpack circuit 514, an add-constant circuit 516, a force-constant circuit 518, and a multiplexor 520. The aligner 510 commonly performs a function of alignment where two floating-point numbers must be aligned before they can be added. The conversion circuit 512 commonly converts from one type of data format to another data format. For example, the conversion circuit 512 may convert a fixed-point number to a floating-point number.

The function of pack and unpack circuit 514 is commonly used in network communications or memory storage. The function of pack arranges data into a pre-defined order before transfer. Similarly, the function of unpack rearranges a packed data into a pre-defined data format. The add-constant circuit 516 adds a constant to the data. The force-constant circuit 518 forces a pre-defined constant such as 1 or 0 to an operand. For example, forcing a zero to operand C is needed during a multiplication between A and B using a device of AB+C.

The multiplexor 520 performs a select function where a correct value is selected. It should be noted that the pre-execution circuit 500 may include different functions.

Figure 6:
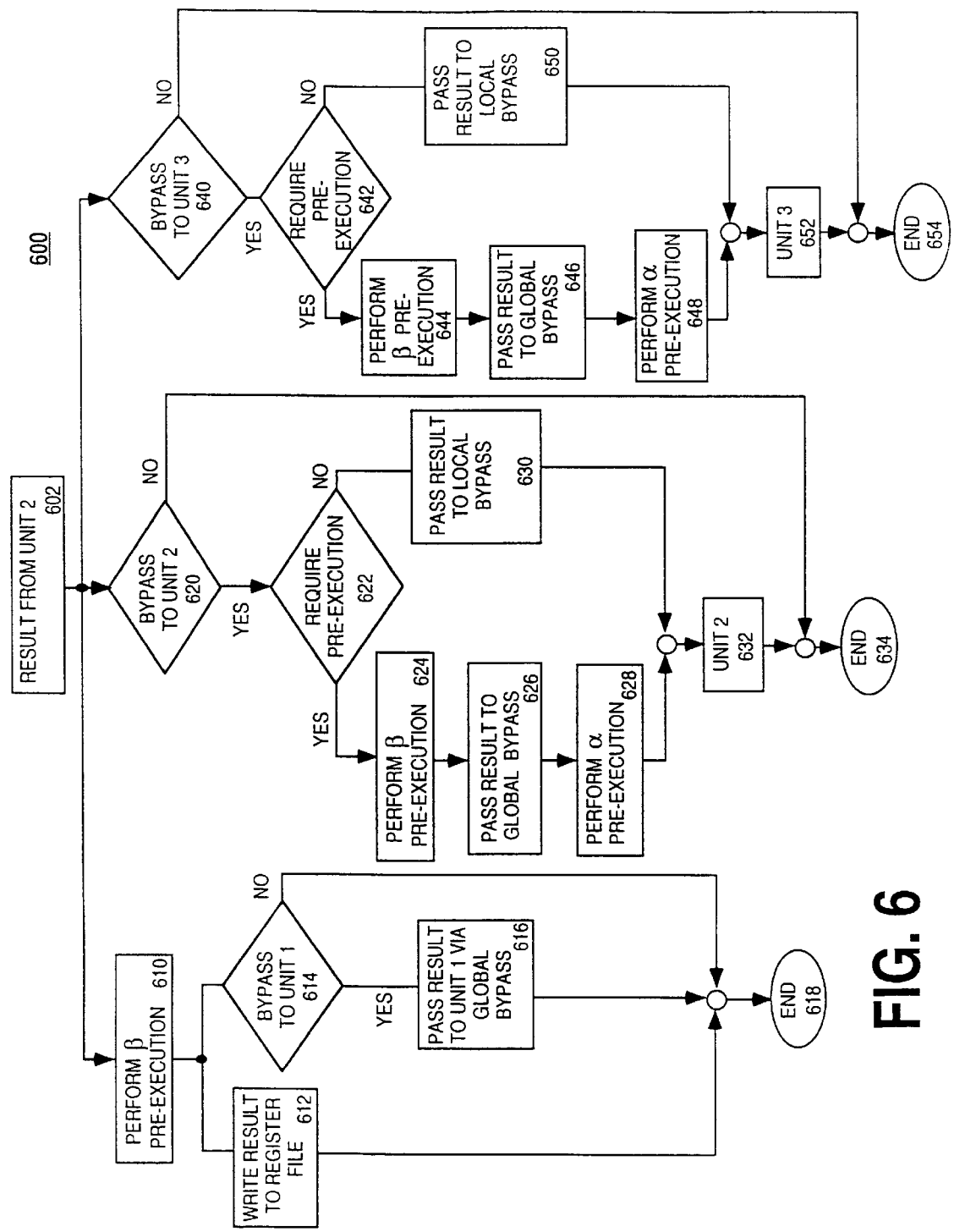
FIG. 6 is a flow chart illustrating an embodiment of a local and global bypass circuit with a pre-execution circuit in accordance with the present invention.

FIG. 6 is a flow chart 600 illustrating a data flow in accordance with an embodiment of the register file system, which includes a global and local bypasses. The process begins at 602 and proceeds to blocks 610, 620, and 640 simultaneously.

At block 640, the process determines whether a bypass to unit 3 is needed. If block 640 is false, which means that the bypass to unit 3 is not needed, the process jumps to block 654 where the process ends. If block 640 is true, the process proceeds to block 642 where the process determines whether pre-executions are required. If block 642 is true, which means that the pre-executions are needed, the process proceeds to block 644 where a beta pre-execution is performed.

After performance of the beta pre-execution, the process moves to block 646 where the result is passed to the global bypass. After block 646, the process proceeds to block 648 where a alpha pre-execution is performed. Upon completion of the alpha pre-execution, the process moves to block 652 where the result reaches unit 3. On the other hand, if block 642 is a false, which means that pre-executions are not needed, the process moves to block 650 where the process passes the result to unit 3 using local bypass. After block 650, the process moves to block 652 where the result reaches unit 3. Subsequently, the process moves to block 654 where the process ends.

At block 620, the process determines whether a bypass to unit 2 is requested. If block 620 is false, which means the bypass to unit 2 is not needed, the process jumps to block 634 where the process ends. If block 620 is true, the process proceeds to block 622 where the process determines whether pre-executions are required. If block 622 is true, which means that the pre-executions are required, the process proceeds to block 624 where a beta pre-execution is performed.

After performance of the beta pre-execution, the process moves to block 626 where the result is passed to the global bypass. After block 626, the process proceeds to block 628 where an alpha pre-execution is performed. After the performance of the alpha pre-execution, the process moves to block 632 where the result reaches unit 2. If block 622 is false, which means that the pre-executions are not needed, the process moves to block 630 where the process passes the result to unit 2 using local bypass. Subsequently, the process proceeds to block 632 from block 630 where the result arrives at unit 2. After block 632, the process proceeds to block 634 where the process ends.

At block 610, the process performs a beta pre-execution on the result. After performance of the beta pre-execution, the process proceeds to block 612 and block 614. At block 612, the process writes the result to the register file. Upon completion of writing to register file, the process moves to block 618.

At block 614, the process determines whether the result should be bypassed to unit 1. If the block 614 is false, the process moves to block 618. On the other hand, if the block 614 is true, which means that the result should be bypassed to unit 1, the process proceeds to block 616 where the result is bypassed to unit 1 using the global bypass. Upon completion of passing the result to unit 1, the process moves to block 618 where the process ends.

Figure 7:
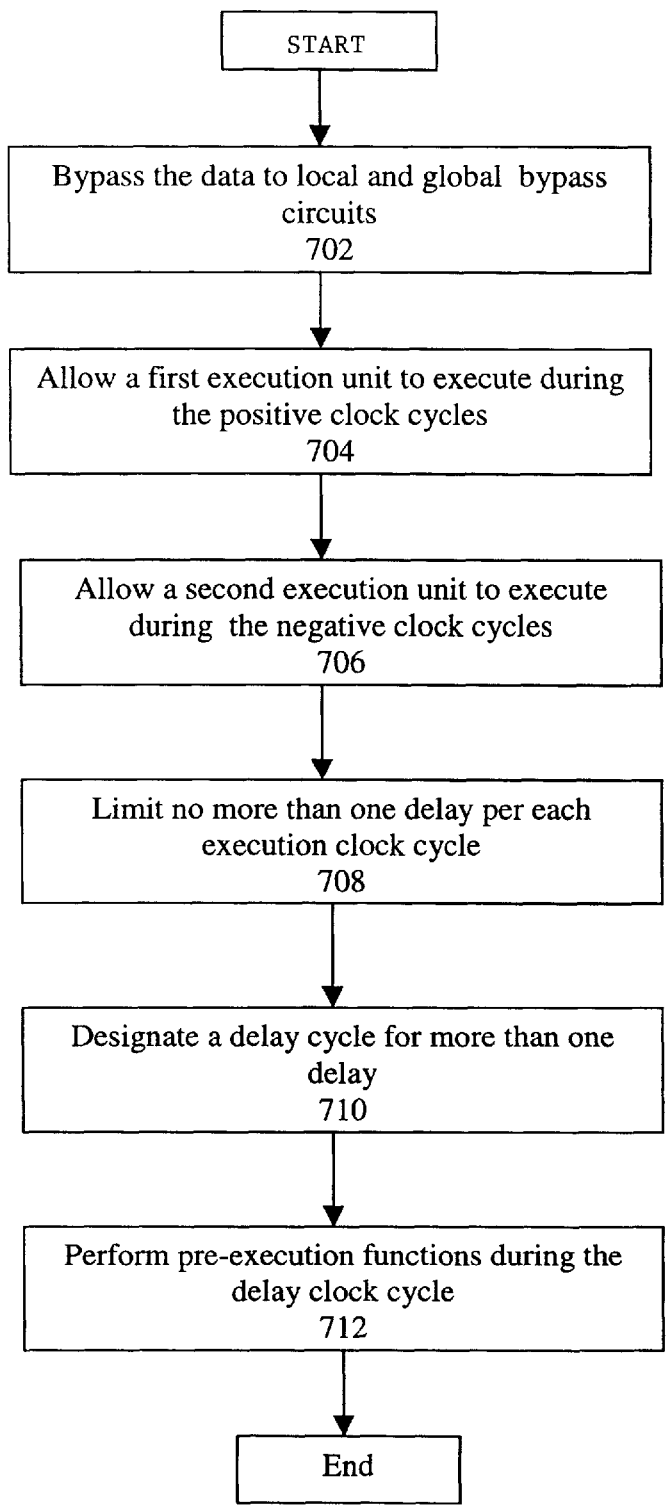
FIG. 7 is a flow chart illustrating one embodiment of a process for bypassing data to bypass circuits.

FIG. 7 is a flow chart 700 illustrating one embodiment of a process for bypassing data to bypass circuits. A process begins at the start block and proceeds to block 702. At block 702, the process bypasses the data to a first execution unit through a global bypass circuit and bypasses the data to a second execution unit through a local bypass circuit. After block 702, the process proceeds to block 704 where the first execution unit is allowed to execute during positive clock cycles. After block 704, the process proceeds to block 706. At block 706, the second execution unit is allowed to execute during negative clock cycles. After block 706, the process proceeds to block 708 where the process limits no more than one delay per each execution clock cycle. After block 708, the process proceeds to block 710 where a delay cycle is designated if more than one delay have occurred. After block 710, the process proceeds to block 712 where the pre-execution functions may be preformed during the delay clock cycles. After block 712, the process moves to the end block where the process ends.

In the foregoing detailed description, a method and apparatus of the present invention has been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A digital processing unit deposit on an integrated circuit comprising:
    a first and second bypass circuits coupled to each other;
    a first execution unit coupled to said first bypass circuit to receive data routed from said first bypass circuit, said first execution unit performing a first function;
    a second execution unit coupled to said second bypass circuit to receive data routed from said second bypass circuit, said second execution unit performing a second function; and
    a control circuit coupled to said first and second execution units, allowing said first execution unit to execute during positive clock cycles and allowing said second execution unit to execute during negative clock cycles.

2. The digital processing unit of claim 1, wherein said positive clock cycle is a clock cycle starting at a raising edge of a clock cycle, wherein said negative clock cycle is a clock cycle starting at a falling edge of a clock cycle.

3. The digital processing unit of claim 1, wherein said first execution unit receives data from said first bypass circuit.

4. The digital processing unit of claim 1, wherein said second execution unit receives data from said second bypass circuit.

5. The digital processing unit of claim 1 further comprising a register file couple to said first bypass circuit for storing data.

6. The digital processing unit of claim 1, wherein said first bypass circuit is situated physically far apart from said second bypass circuit on an IC (Integrated Circuit).

7. The digital processing unit of claim 1 further comprising a pre-execution circuit coupled to said execution units for performing pre-execution functions between a first and second execution clock cycles.

8. A computer system comprising the digital processing unit of claim 1.

9. A processing unit comprising:
    a register file;
    at least two bypass circuits coupled to said register file said two bypass circuits bypassing data stored in said register file;
    a plurality of execution units coupled to said bypass circuits, wherein at least one execution unit is coupled to each said bypass circuit; and
    a control circuit coupled to said execution units and configured to limit no more than one delay per each execution clock cycle, said control circuit further designating a delay clock cycle for said delays.

10. The processing unit of claim 9 further comprising a pre-execution circuit coupled to said execution units for performing pre-execution functions during said delay clock cycles.

11. The processing unit of claim 10, wherein said pre-execution functions include data conversion, packing and unpacking data, forcing a constant, and aligning operands.

12. The processing unit of claim 9, wherein said control circuit further allows some execution units to execute during positive clock cycles and other execution units to execute during negative clock cycles in response to connections between said execution units and said bypass circuits.

13. The processing unit of claim 9, wherein said bypass circuits are situated physically far apart from each other on an IC (Integrated Circuit).

14. The processing unit of claim 9, wherein said delays are wire delays and circuit delays.

15. The processing unit of claim 9, wherein said delay clock is configured to be a half clock cycle or a full clock cycle, wherein said half clock cycle of said delay clock is designated for two delays and said full clock cycle of said delay clock is used for more than two delays.

16. The processing unit of claim 9, wherein said bypass circuits include global and local bypasses.

17. The processing unit of claim 9, wherein said positive clock cycle is a clock cycle starting at a raising edge of a clock cycle, wherein said negative clock cycle is a clock cycle starting at a falling edge of a clock cycle.

18. A computer system comprising the processing unit of claim 9.

19. A method for data processing comprising:
   bypassing data to a first execution unit through a global bypass circuit;
   bypassing said data to a second execution unit through a local bypass circuit;
   allowing said first execution unit to execute during positive clock cycles;
   allowing said second execution unit to execute during negative clock cycles; and
   limiting no more than one delay per each execution clock cycle.

20. The method of claim 19 further comprising:
   designating a delay clock cycle for more than one delay; and
   performing pre-execution functions during said delay clock cycle.

21. The method of claim 19, wherein said positive clock cycle includes triggering at a raising edge of a clock cycle, wherein said negative clock cycle includes starting at a falling edge of a clock cycle.

22. The method of claim 19, further comprising identifying wire delays and circuit delays.

23. The method of claim 20, wherein said designating said delay clock cycle further includes:
   allocating a half clock cycle for two delays; and
   allocating a full clock cycle for more than two delays.

24. The method of claim 20, wherein said performing pre-execution functions further includes:
   aligning data;
   converting data;
   packing data;
   unpacking data;
   adding a constant; and
   forcing a constant.

25. A device used in a computer system comprising:
   at least two bypass circuits coulped to each other for routing data;
   a plurality of execution units coupled to said bypass circuits; wherein
   each said bypass circuit is coupled to at least one execution unit;
   a pre-execution circuit coupled to said execution units for performing pre-execution functions between a first and a second execution clock cycle; and
   a control circuit coupled to said execution units, allowing a first execution unit to execute during positive clock cycles while a second execution unit to execute during negative clock cycles.

26. The device of claim 25, wherein said positive clock cycle is a clock cycle starting at a raising edge of a clock cycle, wherein said negative clock cycle is a clock cycle starting at a falling edge of a clock cycle.

27. The device of claim 25, wherein said first execution unit receives data from said first bypass circuit, wherein said second execution unit receives data from said second bypass circuit.

28. The device of claim 25 further comprising a register file couple to said first bypass circuit for storing data.

29. The device of claim 25, wherein said first bypass circuit is situated physically far apart from said second bypass circuit on an IC (Integrated Circuit).

* * * * *